(12) United States Patent
Ogawa et al.

(10) Patent No.: US 10,826,029 B2
(45) Date of Patent: Nov. 3, 2020

(54) ENERGY STORAGE DEVICE

(71) Applicant: Lithium Energy and Power GmbH & Co. KG, Stuttgart (DE)

(72) Inventors: Masumi Ogawa, Kyoto (JP); Kenji Kawate, Kyoto (JP)

(73) Assignees: GS YUASA INTERNATIONAL LTD., Kyoto (JP); ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 15/760,606

(22) PCT Filed: May 10, 2016

(86) PCT No.: PCT/EP2016/060436
§ 371 (c)(1),
(2) Date: Mar. 15, 2018

(87) PCT Pub. No.: WO2017/045775
PCT Pub. Date: Mar. 23, 2017

(65) Prior Publication Data
US 2019/0044102 A1    Feb. 7, 2019

(30) Foreign Application Priority Data
Sep. 18, 2015    (JP) .................................. 2015-186087

(51) Int. Cl.
*H01M 2/04* (2006.01)
*H01M 2/14* (2006.01)
(Continued)

(52) U.S. Cl.
CPC ............ *H01M 2/043* (2013.01); *H01G 9/048* (2013.01); *H01G 9/08* (2013.01); *H01M 2/0404* (2013.01);
(Continued)

(58) Field of Classification Search
None
See application file for complete search history.

(56) References Cited

U.S. PATENT DOCUMENTS

2002/0142195 A1*  10/2002  Ehara .................. H01M 2/0215
                                                                    429/7
2005/0181242 A1    8/2005  Suzuki et al.
(Continued)

FOREIGN PATENT DOCUMENTS

EP    2 426 752 A2    3/2012
JP    H 07-153488 A    6/1995
(Continued)

OTHER PUBLICATIONS

International Search Report (ISR) (PCT Form PCT/ISA/210), in PCT/EP2016/060436, dated Jun. 15, 2016.

*Primary Examiner* — Jonathan G Leong
*Assistant Examiner* — Kirsten B Tysl
(74) *Attorney, Agent, or Firm* — McGinn I.P. Law Group, PLLC.

(57) ABSTRACT

An energy storage device includes: an electrode assembly; a case accommodating the electrode assembly; a lid plate structure including a lid plate of the case, a current collector electrically connected to a tab provided at the electrode assembly, and an insulating member disposed between the lid plate and the current collector; and a first spacer disposed between an end provided with the tab of the electrode assembly and the lid plate and having a locked portion locked to part of the lid structure.

19 Claims, 8 Drawing Sheets

(51) Int. Cl.
*H01M 10/0525* (2010.01)
*H01M 2/22* (2006.01)
*H01G 9/048* (2006.01)
*H01G 9/08* (2006.01)

(52) U.S. Cl.
CPC ............... *H01M 2/14* (2013.01); *H01M 2/22* (2013.01); *H01M 10/0525* (2013.01); *Y02T 10/7011* (2013.01)

(56) References Cited

U.S. PATENT DOCUMENTS

| | | | |
|---|---|---|---|
| 2006/0269838 A1 | 11/2006 | Song et al. | |
| 2008/0233474 A1* | 9/2008 | Son | H01M 2/0404 429/129 |
| 2009/0061306 A1 | 3/2009 | Uh | |
| 2013/0209859 A1* | 8/2013 | Tsuruta | H01G 9/06 429/142 |
| 2015/0228935 A1 | 8/2015 | Seong | |
| 2015/0380691 A1 | 12/2015 | Tsuruta et al. | |

FOREIGN PATENT DOCUMENTS

| | | |
|---|---|---|
| JP | 2004-014395 A | 1/2004 |
| JP | 2004-207089 A | 7/2004 |
| JP | 2013-033662 A | 2/2013 |
| JP | 2013-191544 A | 9/2013 |

\* cited by examiner

ENERGY STORAGE DEVICE

TECHNICAL FIELD

The present invention relates to an energy storage device including an electrode assembly and a case accommodating the electrode assembly.

BACKGROUND ART

There has been conventionally known a configuration of an energy storage device that includes an electrode assembly and a case accommodating the electrode assembly. A spacer or the like is disposed in a space between the electrode assembly and the case so as to fill at least partially the space. For example, Patent Document 1 discloses a sealed horizontally-wound battery in which an upper insulating plate is disposed and fixed to a power generating element with an adhesive tape so as to cover and close a negative electrode tab provided at the power generating element.

PRIOR ART DOCUMENT

Patent Document

Patent Document 1: JP-A-2004-014395

SUMMARY OF THE INVENTION

Problems to be Solved by the Invention

Like the sealed horizontally-wound battery, in an energy storage device, when an insulating spacer or the like is disposed at an end provided with a tab of a positive or negative electrode of an electrode assembly, the spacer is disposed on an end edge of a separator in a sheet shape projecting beyond the positive and negative electrodes toward a lid plate. Also in a configuration in which the electrode assembly is not provided with the tab and instead an active material unapplied portion projects, the spacer is disposed on an end edge of the active material unapplied portion.

The spacer is disposed on a soft end surface formed by aligned end edges of the separator or the active material unapplied portion, and the spacer is thus difficult to be stabilized positionally, for example. This is not preferred in terms of improvement in quality of the energy storage device, for example.

In view of the conventional problems mentioned above, an object of the present invention is to provide an energy storage device that includes an electrode assembly and a case accommodating the electrode assembly and has excellent quality.

Means for Solving the Problems

In order to achieve the object mentioned above, an energy storage device according to an aspect of the present invention includes an electrode assembly and a case accommodating the electrode assembly. The energy storage device further includes: a lid plate structure including a lid plate of the case, a current collector electrically connected to a tab provided at the electrode assembly, and an insulating member disposed between the lid plate and the current collector; and a first spacer disposed between an end provided with the tab of the electrode assembly and the lid plate and having a locked portion locked to part of the lid plate structure.

According to this configuration, the first spacer is disposed between the end provided with the tab of the electrode assembly and the lid plate. The first spacer can thus directly or indirectly inhibit movement of the electrode assembly toward the lid plate, for example. The first spacer further secures electrical insulation between one of the positive electrode and the negative electrode of the electrode assembly and an element of a lid plate structure connected to the other one of the positive electrode and the negative electrode, for example.

The first spacer also has a locked portion that is locked to part of the lid plate structure configured by a component group including the lid plate. The first spacer itself is locked to the lid plate structure so as to be regulated positionally. The first spacer is thus disposed at a proper position and is kept in the positionally regulated state, for example. Specifically, positional variation of the first spacer is inhibited when a plurality of energy storage devices is mass-produced.

The first spacer is positionally regulated with no provision of any dedicated component for such positional regulation. The energy storage device can thus be produced efficiently.

The energy storage device according to this aspect includes the electrode assembly and the case accommodating the electrode assembly and has excellent quality.

In the energy storage device according to an aspect of the present invention, optionally, a first one of the part of the lid plate structure and the locked portion has a projection projecting in a direction crossing an alignment direction of the electrode assembly and the lid plate, and a second one of the part of the lid plate structure and the locked portion has an insertion port allowing the projection to be inserted thereto.

According to this configuration, one of the first spacer and the lid plate structure has the projection that is inserted to the insertion port provided at the other one, so that the first spacer is locked to the lid plate structure. The projection projects in a direction crossing the alignment direction of the electrode assembly and the lid plate. When the alignment direction of the electrode assembly and the lid plate agrees with the vertical direction, the locked portion of the first spacer is locked to the lid plate structure in a state where the projection is horizontally inserted to the insertion port. The first spacer is positionally regulated in the vertical direction in the case without useless occupation of a space in the vertical direction in the case, for example. This is advantageous in terms of increase in occupancy of the electrode assembly in the volume of the case, in other words, increase in capacity of the energy storage device, for example.

In the energy storage device according to an aspect of the present invention, optionally, the part of the lid plate structure is provided at the insulating member.

According to this configuration, the portion configured to lock the locked portion of the first spacer is provided at the insulating member insulating the current collector from the lid plate. The insulating member is produced by resin molding or the like, and is thus easily shaped to have the configuration for locking the locked portion. That is, the element positionally regulating the first spacer has high flexibility in shape, position, or size.

In the energy storage device according to an aspect of the present invention, optionally, the first spacer has an opening allowing the tab to be inserted thereto.

According to this configuration, the first spacer can be formed to secure the space allowing the tab to be inserted thereto as well as cover the portion other than the tab in a top view (when the electrode assembly is viewed from the lid plate). That is, the first spacer can be formed to have a shape and a size appropriate for more reliable positional regulation of the electrode assembly, for example.

Optionally, the energy storage device according to an aspect of the present invention further includes a second spacer disposed between a side surface of the electrode assembly in a direction crossing the alignment direction of the electrode assembly and the lid plate and an inner surface of the case, and the first spacer has an end interposed between the second spacer and the lid plate structure.

According to this configuration, the second spacer regulates the horizontal position of the electrode assembly, for example. Furthermore, the end of the first spacer is interposed between the second spacer and the lid plate structure. The first spacer is thus positionally regulated more reliably.

In the energy storage device according to an aspect of the present invention, optionally, the electrode assembly is formed by winding electrodes, and the first spacer is disposed in a winding axis direction of the electrode assembly at an end provided with the tab.

According to this configuration, the electrode assembly of the winding type is accommodated in the case in a posture provided with the first spacer and the lid plate structure in the winding axis direction, and the first spacer is disposed in the state of being locked to the lid plate structure. The first spacer can thus be disposed independently from the soft end surface formed by the end edge of the separator in a sheet shape wound along with the electrodes.

In the energy storage device according to an aspect of the present invention, optionally, the electrode assembly is provided with a separator projecting in the winding axis direction.

When the electrode assembly is provided with the projecting separator, the first spacer is disposed on the end surface of the soft separator and is thus difficult to be positioned. In contrast, the energy storage device according to the present invention can be produced with the first spacer being positioned easily even in such a case.

Optionally, an energy storage device according to an aspect of the present invention includes an electrode assembly and a case accommodating the electrode assembly. The energy storage device further includes: a lid plate structure including a lid plate of the case, a current collector electrically connected to the electrode assembly, and an insulating member disposed between the lid plate and the current collector; and a first spacer disposed between the electrode assembly and the lid plate and having a locked portion locked to part of the lid plate structure.

According to this configuration, even when the electrode assembly does not have any tab, the energy storage device can achieve high quality as described above.

Advantages of the Invention

The present invention can provide an energy storage device that includes an electrode assembly and a case accommodating the electrode assembly and has excellent quality.

MODE FOR CARRYING OUT THE INVENTION

An energy storage device according to each of embodiments of the present invention will now be described below with reference to the drawings. These drawings are schematic views and do not necessarily show exact configurations.

Embodiments to be described below each specifically exemplify the present invention. Shapes, materials, constituent elements, locations and connection states of the constituent elements, the order of the production steps, and the like to be mentioned in the following embodiments are merely exemplary and will not limit the scope of the present invention. Among the constituent elements according to the following embodiments, those not recited in the independent claims each referring to the superordinate concept are to be described as optional constituent elements.

An energy storage device 10 according to an embodiment will be generally described with reference to FIGS. 1 to 3.

Figure 1:
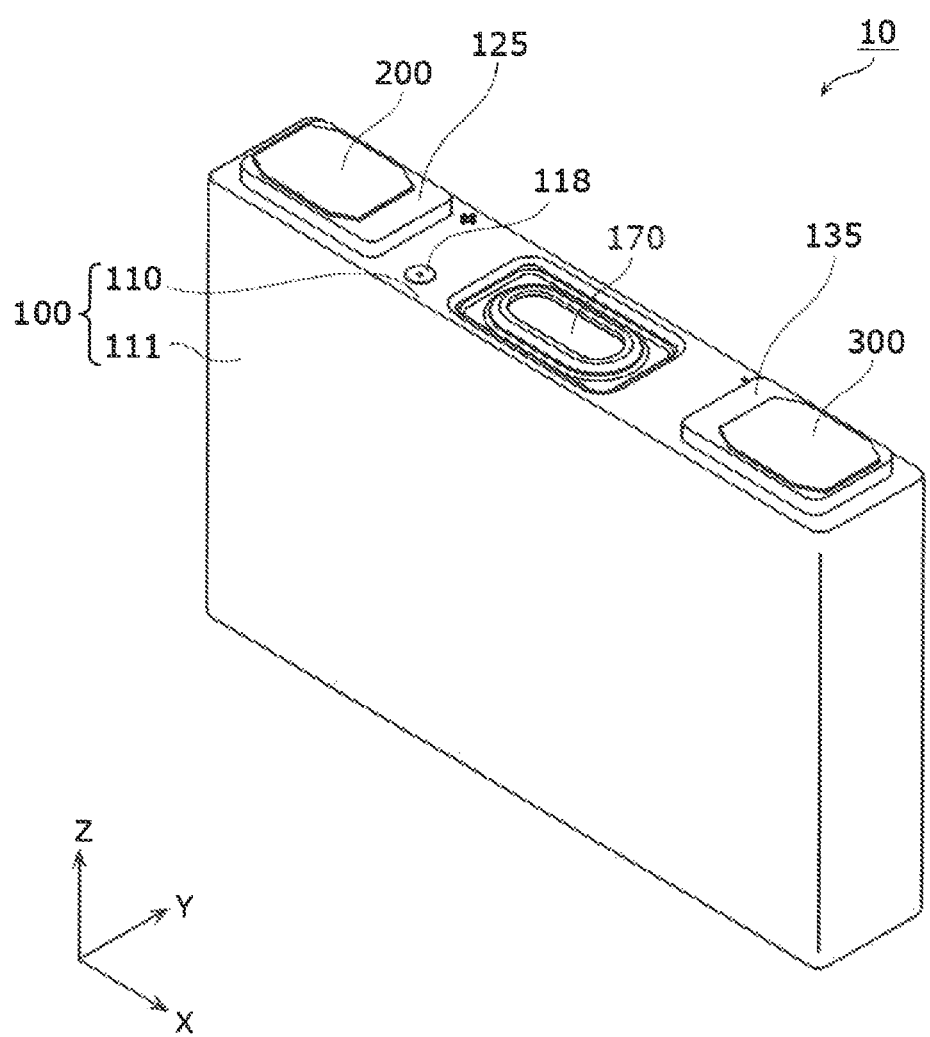
FIG. 1: a perspective view of outer appearance of an energy storage device according to an embodiment.

FIG. 1 is a perspective view of outer appearance of the energy storage device 10 according to the embodiment. FIG. 2 is an exploded perspective view of the energy storage device 10 according to the embodiment. FIG. 3 is an exploded perspective view of a lid plate structure 180 according to the embodiment. FIG. 3 shows, with dotted lines, a positive electrode lead plate 145 and a negative electrode lead plate 155 joined to a positive electrode current collector 140 and a negative electrode current collector 150 included in the lid plate structure 180, respectively.

FIG. 1 and subsequent drawings assume that a Z axis direction agrees with the vertical direction for easier description, although the Z axis direction may not always agree with the vertical direction in actual use.

The energy storage device 10 is a secondary battery configured to charge and discharge electricity, and more specifically is a nonaqueous electrolyte secondary battery such as a lithium ion secondary battery. The energy storage device 10 is applied to an electric vehicle (EV), a hybrid electric vehicle (HEV), a plug-in hybrid electric vehicle (PHEV), or the like. The energy storage device 10 is not limited to the nonaqueous electrolyte secondary battery, but can be a secondary battery other than the nonaqueous electrolyte secondary battery or can be a capacitor.

As shown in FIG. 1, the energy storage device 10 includes a case 100, a positive electrode terminal 200, and a negative electrode terminal 300. As shown in FIG. 2, the case 100 accommodates an electrode assembly 400 that is provided thereabove with the lid plate structure 180.

The lid plate structure 180 includes a lid plate 110 of the case 100, a current collector electrically connected to a tab provided at the electrode assembly 400, and an insulating member disposed between the lid plate 110 and the current collector. The lid plate structure 180 according to the present embodiment includes, as the current collector, the positive electrode current collector 140 electrically connected to a tab 410 for the positive electrode of the electrode assembly 400 and the negative electrode current collector 150 electrically connected to a tab 420 for the negative electrode of the electrode assembly 400. The lid plate structure 180 also includes, as the insulating member, a lower insulating member 120 disposed between the lid plate 110 and the positive electrode current collector 140 and a lower insulating member 130 disposed between the lid plate 110 and the negative electrode current collector 150.

The lid plate structure 180 according to the present embodiment further includes the positive electrode terminal 200, the negative electrode terminal 300, an upper insulating member 125 disposed between the lid plate 110 and the positive electrode terminal 200, and an upper insulating member 135 disposed between the lid plate 110 and the negative electrode terminal 300.

There are provided an upper spacer 500 and a buffer sheet 600, which are disposed between the lid plate structure 180 thus configured and the electrode assembly 400.

The upper spacer 500 exemplifies a first spacer, is disposed between an end provided with the tabs 410 and 420 of the electrode assembly 400 and the lid plate 110, and has locked portions 510 locked to part of the lid plate structure 180. In other words, the upper spacer 500 has the locked portions 510 as portions hooked to part of the lid plate structure 180.

Specifically, the entire upper spacer 500 has a tabular shape, and has the two locked portions 510 and two openings 520 allowing the tabs 410 and 420 to be inserted thereto (allowing the tabs 410 and 420 to pass therethrough). The openings 520 according to the present embodiment are provided at the upper spacer 600 as cut-away sections. The upper spacer 500 can be made of an insulating material such as polycarbonate (PC), polypropylene (PP), polyethylene (PE), or polyphenylene sulfide resin (PPS).

The upper spacer 500 serves as a member directly or indirectly regulating upward movement (toward the lid plate 110) of the electrode assembly 400, or a member preventing short circuit between the lid plate structure 180 and the electrode assembly 400, for example. The upper spacer 500 has the two locked portions 510 each of which is locked to an attachment portion 122 or 132 provided at the lid plate structure 180. The buffer sheet 600 is made of a highly soft porous material such as foamed polyethylene, and serves as a buffer member between the electrode assembly 400 and the upper spacer 500. A structure for disposition of the upper spacer 500 in the energy storage device 10 will be described later with reference to FIGS. 6A and 6B.

In the present embodiment, there is provided a side spacer 700 between each of side surfaces, of the electrode assembly 400, extending in a direction crossing an alignment direction (the Z axis direction) of the electrode assembly 400 and the lid plate 110 (the side surfaces in an X axis direction in the present embodiment) and the inner surface of the case 100. The side spacers 700 each exemplify a second spacer and are provided to regulate the position of the electrode assembly 400, for example. The side spacers 700 can be made of an insulating material such as PC, PP, PE, or PPS, similarly to the upper spacer 600, for example. The side spacers 700 according to the present embodiment also serve as members positionally regulating the upper spacer 500. A structural relation between the side spacers 700 and the upper spacer 500 will be described later with reference to FIG. 7.

Figure 2:
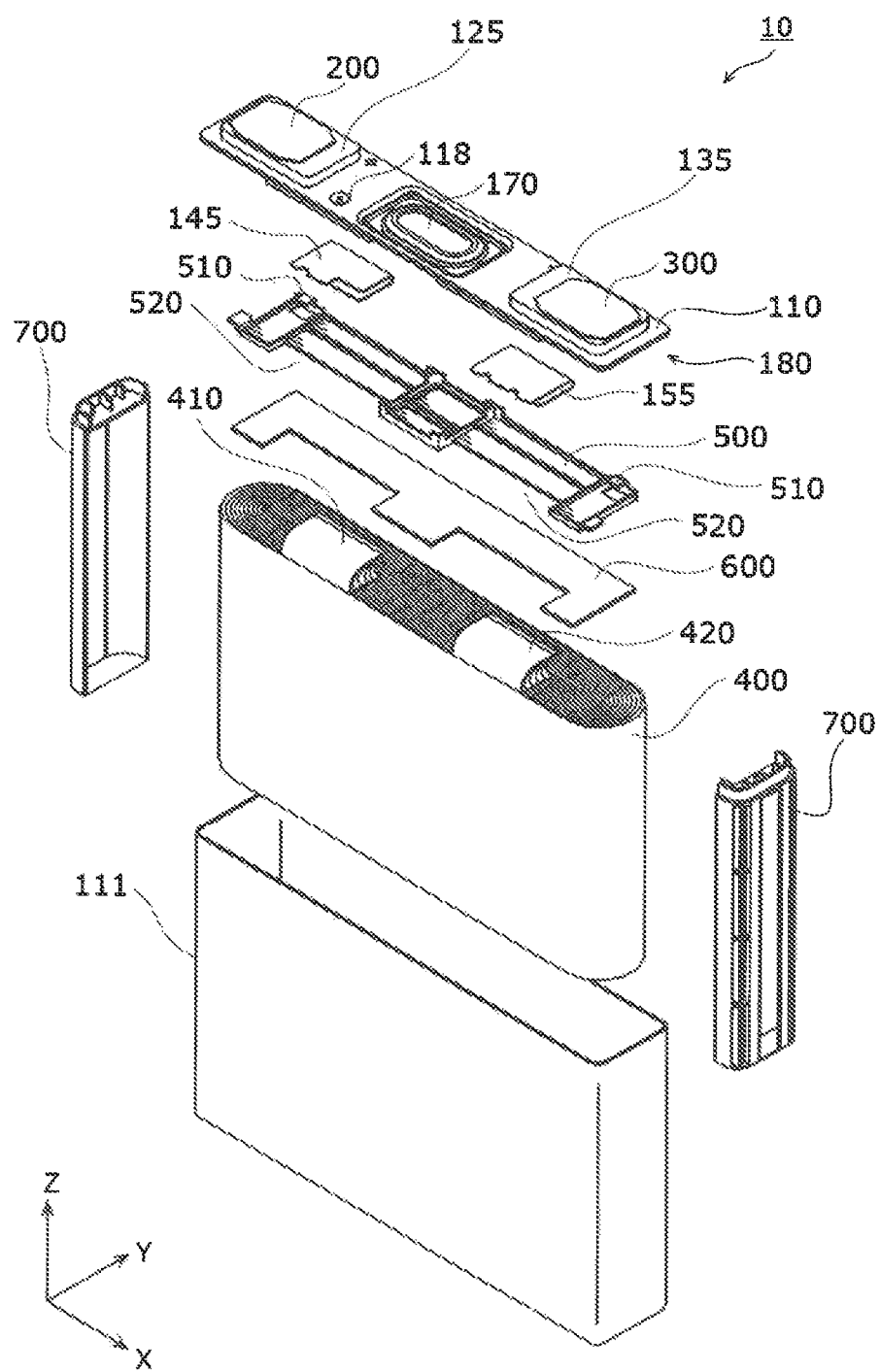
FIG. 2: an exploded perspective view of the energy storage device according to the embodiment.
Figure 3:
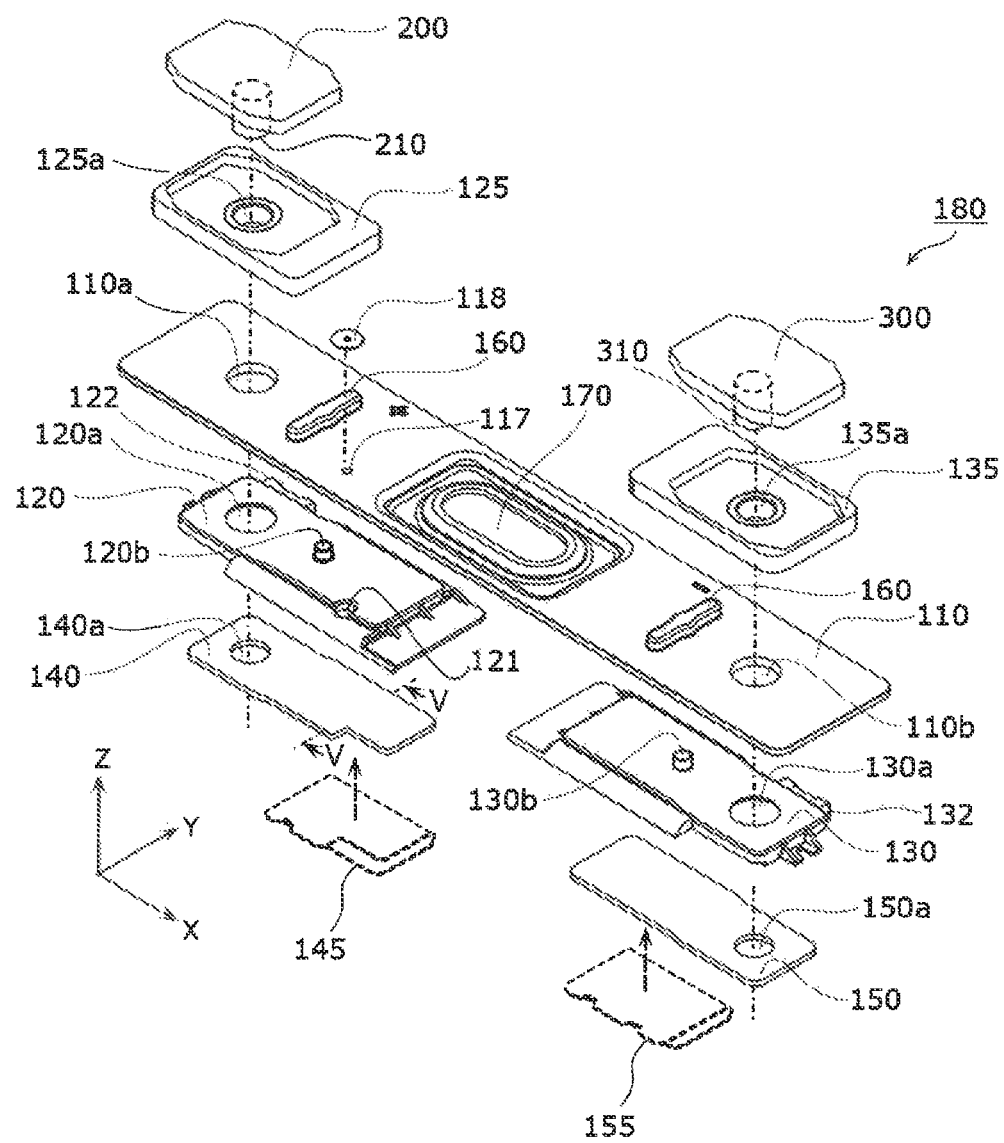
FIG. 3: an exploded perspective view of a lid plate structure according to the embodiment.

In addition to the elements shown in FIGS. 1 to 3, the energy storage device 10 can include elements such as an insulating film wrapping the electrode assembly 400 and a buffer sheet provided between the electrode assembly 400 and the bottom surface of the case 100 (a main body 111). The case 100 of the energy storage device 10 encloses an electrolyte solution (a nonaqueous electrolyte) which is not shown in the figures.

The case 100 includes the main body 111 having a bottomed rectangular cylindrical shape and the lid plate 110 as a plate member closing an opening of the main body 111. The lid plate 110 and the main body 111 are welded after the electrode assembly 400 and the like are accommodated in the case 100 so as to hermetically seal the inner space of the case 100. The lid plate 110 and the main body 111 are not particularly limited in terms of their materials, but are preferably made of weldable metal such as stainless steel, aluminum, or aluminum alloy.

As shown in FIGS. 2 and 3, the lid plate 110 is provided with a safety valve 170, an electrolyte solution filling port 117, through holes 110a and 110b, and two swelling portions 160 as projections. The safety valve 170 is provided to be opened to discharge gas in the case 100 when internal pressure of the case 100 increases.

The electrolyte solution filling port 117 is a through hole allowing the electrolyte solution to be filled therethrough during production of the energy storage device 10. As shown in FIGS. 1 to 3, the lid plate 110 is provided with an electrolyte solution filling plug 118 configured to close the electrolyte solution filling port 117. During production of the energy storage device 10, the electrolyte solution is injected through the electrolyte solution filling port 117 into the case 100 and the electrolyte solution filling plug 118 is welded to the lid plate 110 to close the electrolyte solution filling port 117, so that the electrolyte solution is enclosed in the case 100.

The electrolyte solution enclosed in the case 100 is not particularly limited in terms of its type but can be of any type, unless the electrolyte solution adversely affects performance of the energy storage device 10.

The two swelling portions 160 according to the present embodiment are provided at the lid plate 110 by partially swelling the lid plate 110, and are each used to position the upper insulating member 125 or 135, for example. Each of the swelling portions 160 is provided, at an upper portion of the rear surface (facing the electrode assembly 400), with a recess as a recessed portion (not shown). The recess partially engages with an engaging portion 120b or 130b of the lower insulating member 120 or 130. Accordingly, the lower insulating member 120 or 130 is also positioned and fixed to the lid plate 110 in this state.

The upper insulating member 125 electrically insulates the positive electrode terminal 200 from the lid plate 110 whereas the lower insulating member 120 electrically insulates the positive electrode current collector 140 from the lid plate 110. The upper insulating member 135 electrically insulates the negative electrode terminal 300 from the lid plate 110 whereas the lower insulating member 130 electrically insulates the negative electrode current collector 150 from the lid plate 110. The upper insulating members 125 and 135 can be also referred to as upper gaskets whereas the lower insulating members 120 and 130 can be also referred to as lower gaskets. In other words, the upper insulating members 125 and 135 as well as the lower insulating members 120 and 130 also serve as sealers between the electrode terminals (200 and 300) and the case 100 in the present embodiment.

The upper insulating members 125 and 135 as well as the lower insulating members 120 and 130 are each made of an insulating material such as PC, PP, PE, or PPS, similarly to the upper spacer 500. The lower insulating member 120 is provided, at a portion immediately below the electrolyte solution filling port 117, with a through hole 121 that guides the electrolyte solution entering from the electrolyte solution filling port 117 toward the electrode assembly 400.

The positive electrode terminal 200 is electrically connected to the positive electrode of the electrode assembly 400 via the positive electrode current collector 140 whereas the negative electrode terminal 300 is electrically connected to the negative electrode of the electrode assembly 400 via the negative electrode current collector 150. The positive electrode terminal 200 and the negative electrode terminal 300 are metal electrode terminals configured to guide electricity stored in the electrode assembly 400 to the external space of the energy storage device 10 and guide electricity to the internal space of the energy storage device 10 so as to store the electricity in the electrode assembly 400. The positive electrode terminal 200 and the negative electrode terminal 300 are made of aluminum, aluminum alloy, or the like.

The positive electrode terminal 200 is provided with a fastening portion 210 fastening the case 100 and the positive electrode current collector 140 whereas the negative electrode terminal 300 is provided with a fastening portion 310 fastening the case 100 and the negative electrode current collector 150.

The fastening portion 210 is a member (rivet) extending downward from the positive electrode terminal 200, and is inserted and caulked to a through hole 140a provided at the positive electrode current collector 140. Specifically, the fastening portion 210 is inserted and caulked to a through hole 125a at the upper insulating member 125, the through hole 110a at the lid plate 110, a through hole 120a at the lower insulating member 120, and the through hole 140a at the positive electrode current collector 140. Accordingly, the positive electrode terminal 200 and the positive electrode current collector 140 are electrically connected to each other, and the positive electrode current collector 140 is fixed to the lid plate 110 together with the positive electrode terminal 200, the upper insulating member 125, and the lower insulating member 120.

The fastening portion 310 is a member (rivet) extending downward from the negative electrode terminal 300, and is inserted and caulked to a through hole 150a provided at the negative electrode current collector 150. Specifically, the fastening portion 310 is inserted and caulked to a through hole 135a at the upper insulating member 135, the through hole 110b at the lid plate 110, a through hole 130a at the lower insulating member 130, and the through hole 150a at the negative electrode current collector 150. Accordingly, the negative electrode terminal 300 and the negative electrode current collector 150 are electrically connected to each other and the negative electrode current collector 150 is fixed to the lid plate 110 together with the negative electrode terminal 300, the upper insulating member 135, and the lower insulating member 130.

The fastening portion 210 can be provided integrally with the positive electrode terminal 200. Alternatively, the fastening portion 210 can be provided separately from the positive electrode terminal 200 and can be fixed to the positive electrode terminal 200 by caulking, welding, or the like. The fastening portion 310 and the negative electrode terminal 300 are provided similarly in terms of the relation therebetween.

The positive electrode current collector 140 is a member disposed between the electrode assembly 400 and the case 100 to electrically connect the electrode assembly 400 and the positive electrode terminal 200. The positive electrode current collector 140 is made of aluminum, aluminum alloy, or the like. The positive electrode current collector 140 according to the present embodiment is electrically connected to the tab 410 for the positive electrode of the electrode assembly 400 via the positive electrode lead plate 145.

The negative electrode current collector 150 is a member disposed between the electrode assembly 400 and the case 100 to electrically connect the electrode assembly 400 and the negative electrode terminal 300. The negative electrode current collector 150 is made of copper, copper alloy, or the like. The negative electrode current collector 150 according to the present embodiment is electrically connected to the tab 420 for the negative electrode of the electrode assembly 400 via the negative electrode lead plate 155 (see FIG. 2).

A connection portion between the current collector and the tab via the lead plate will be described in detail later with reference to FIG. 5.

Figure 4:
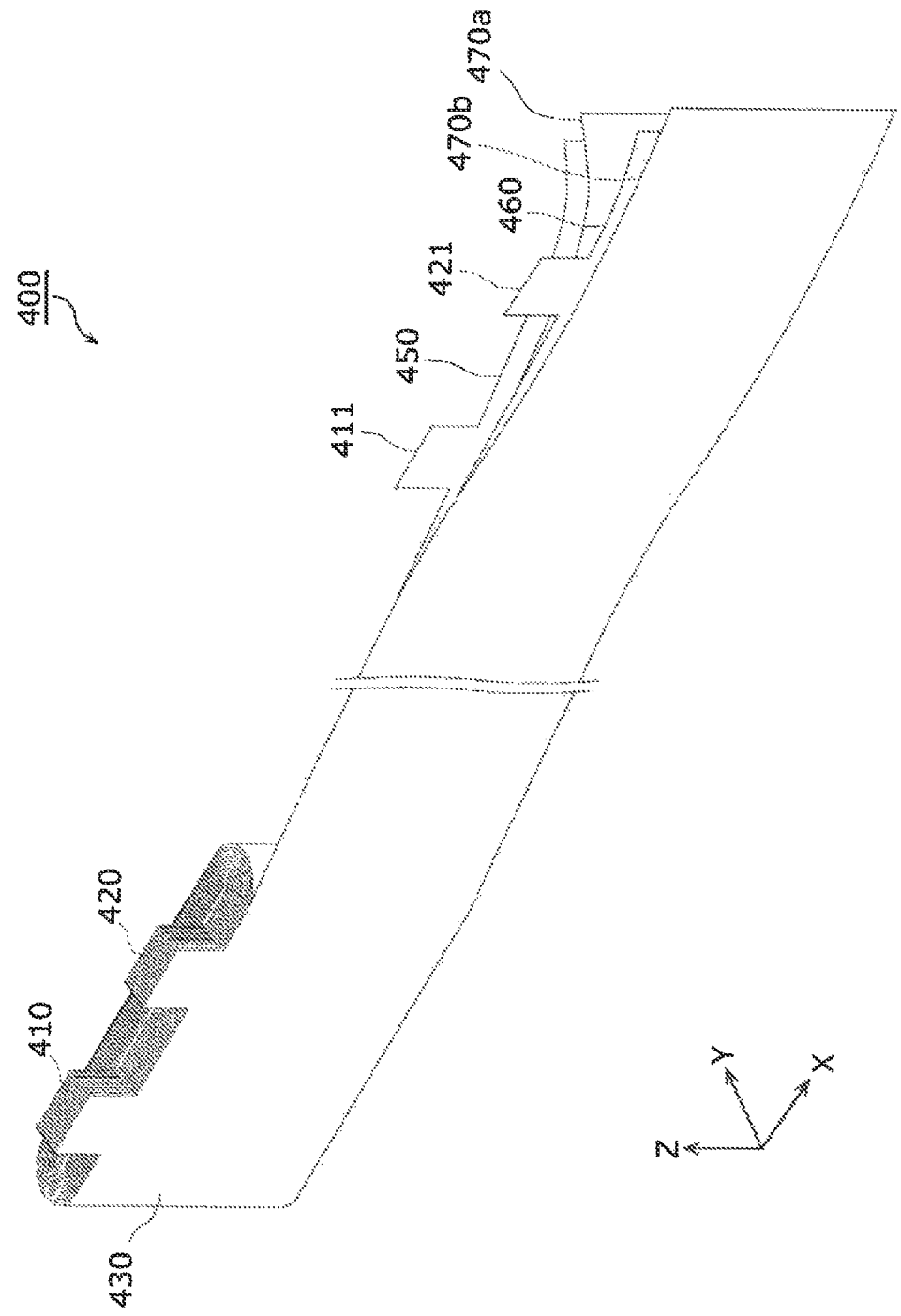
FIG. 4: a perspective view of a configuration of an electrode assembly according to the embodiment.

The configuration of the electrode assembly 400 will be described next with reference to FIG. 4. FIG. 4 is a perspective view of a configuration of the electrode assembly 400 according to the embodiment. FIG. 4 shows a state where the wound electrode assembly 400 is partially developed.

The electrode assembly 400 is a power generating element configured to store electricity. As shown in FIG. 4, the electrode assembly 400 includes a positive electrode 460, a negative electrode 460, and separators 470a and 470b, which are layered alternately and wound. Specifically, the electrode assembly 400 includes the positive electrode 450, the separator 470a, the negative electrode 460, and the separator 470b, which are layered in the mentioned order and are wound so as to have an elliptical cross section. The separators 470a and 470b of the electrode assembly 400 project in the winding axis direction (to the positive side and the negative side in the Z axis direction). This configuration inhibits short circuit between the electrode assembly 400 and a different conductive member in the winding axis direction.

The positive electrode 450 is an electrode plate that includes a positive electrode substrate layer of metal foil having a long belt shape and made of aluminum, aluminum alloy, or the like, and a positive active material layer provided on a surface of the positive electrode substrate layer. The positive active material layer is made of a positive active material that can be any appropriate known material if the positive active material can occlude and emit lithium ions. Examples of the positive active material include polyanion compounds such as $LiMPO_4$, $LiMSiO_4$, and $LiMBO_3$ (where M is one, two or more transition metal elements selected from Fe, Ni, Mn, Co, and the like), spinel compounds such as lithium titanate and lithium manganate, and lithium transition metal oxide such as $LiMO_2$ (where M is one, two or more transition metal elements selected from Fe, Ni, Mn, Co, and the like).

The negative electrode 460 is an electrode plate that includes a negative electrode substrate layer of metal foil having a long belt shape and made of copper, copper alloy, or the like, and a negative active material layer provided on a surface of the negative electrode substrate layer. The negative active material layer is made of a negative active material that can be any appropriate known material if the negative active material can occlude and emit lithium ions.

Examples of the negative active material include lithium metal, lithium alloy (lithium metal containing alloy such as lithium aluminum, lithium lead, lithium tin, lithium aluminum tin, lithium gallium, and wood's alloy), lithium occludable and emittable alloy, carbon materials (e.g. graphite, hardly graphitizable carbon, easily graphitizable carbon, low-temperature baked carbon, and amorphous carbon), metal oxide, lithium metal oxide (e.g. $Li_4Ti_5O_{12}$), and a polyphosphoric acid compound.

The separators 470a and 470b are micro porous sheets made of resin. The separators 470a and 470b included in the energy storage device 10 can be made of any appropriate known material if the material does not adversely affect performance of the energy storage device 10.

The positive electrode 450 has a plurality of projecting portions 411 projecting outward from an end in the winding axis direction of the positive electrode 450. The negative electrode 460 similarly has a plurality of projecting portions 421 projecting outward from an end in the winding axis direction of the negative electrode 460. At each of the plurality of projecting portions 411 and the plurality of projecting portions 421, the active material is not applied and the substrate layer is exposed (active material unapplied portions).

The winding axis is a virtual center axis of the wound positive and negative electrodes 4560 and 460, and agrees with a straight line parallel to the Z axis direction including the center of the electrode assembly 400 in the present embodiment.

The plurality of projecting portions 411 and the plurality of projecting portions 421 are disposed at an identical end in the winding axis direction (the end on the positive side in the Z axis direction in FIG. 4), and are layered at a predetermined position of the electrode assembly 400 when the positive electrode 450 and the negative electrode 460 are layered. Specifically, the plurality of projecting portions 411 is layered at a predetermined circumferential position at an end in the winding axis direction when the positive electrode 450 is wound and layered. The plurality of projecting portions 421 is layered at a predetermined circumferential position different from the position of the plurality of layered projecting portions 411 at the end in the winding axis direction, when the negative electrode 460 is wound and layered.

The electrode assembly 400 is accordingly provided with the tab 410 formed by the plurality of layered projecting portions 411 and the tab 420 formed by the plurality of layered projecting portions 421. The tab 410 is gathered toward the center in the layered direction, for example, and is joined to the positive electrode lead plate 145 by ultrasonic welding or the like. The tab 420 is gathered toward the center in the layered direction, for example, and is joined to the negative electrode lead plate 155 by ultrasonic welding or the like. The positive electrode lead plate 146 joined with the tab 410 is joined to the positive electrode current collector 140 whereas the negative electrode lead plate 155 joined with the tab 420 is joined to the negative electrode current collector 150.

The tabs (410 and 420) guide electricity into and out of the electrode assembly 400, and may also be each called "a lead (portion)", "a current collecting portion", or the like.

The tab 410, which is formed by layering the projecting portions 411 as the exposing portions of the substrate layer, is not involved in power generation. Similarly, the tab 420, which is formed by layering the projecting portions 421 as the exposing portions of the substrate layer, is not involved in power generation. In contrast, the portion of the electrode assembly 400 other than the tabs 410 and 420, which is formed by layering the portion of the substrate layer provided with the active material, is involved in power generation. The portion involved in power generation will be hereinafter referred to as a power generating portion 430.

An exemplary configuration of the connection portion between the current collector and the tab via the lead plate will be described next with reference to FIG. 5.

Figure 5:
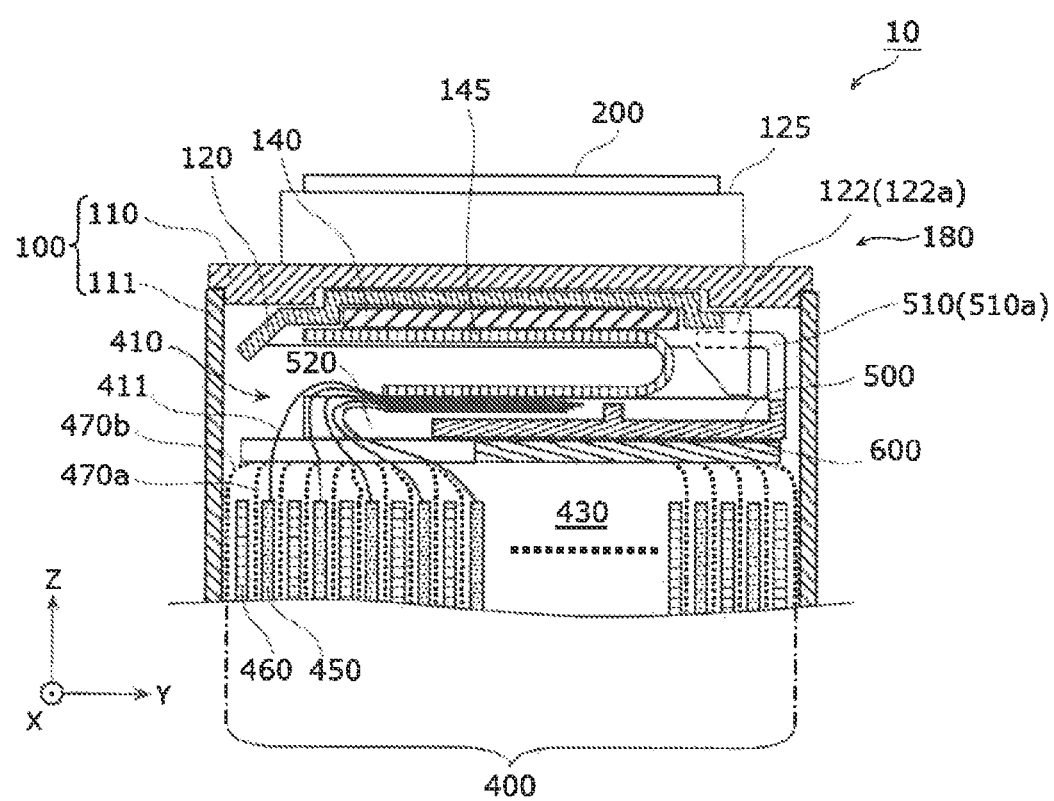
FIG. 5: an outlined sectional view of a positive electrode lead plate and its peripheral structure according to the embodiment.

FIG. 5 is an outlined sectional view of the positive electrode lead plate 145 and its peripheral structure according to the embodiment. FIG. 5 shows a cross section of part of the energy storage device 10 taken along a YZ plane including line V-V indicated in FIG. 3, and does not show the side spacer 700 on the negative side in the X axis direction (see FIG. 2). The electrode assembly 400 is shown in a simplified manner.

As shown in FIG. 5, the tab 410 of the electrode assembly 400 and the positive electrode current collector 140 are electrically connected to each other via the positive electrode lead plate 146 having a cross section in a U shape. Such a connection structure is formed through the following procedure, for example.

An end (a first end) of the positive electrode lead plate 145 in a tabular shape and the tab 410 of the electrode assembly 400 are joined to each other by ultrasonic welding or the like. The end (a second end) opposite to the first end of the positive electrode lead plate 145 is joined to the positive electrode current collector 140 assembled to the lid plate structure 180 by laser welding or the like. The positive electrode lead plate 145 is subsequently deformed into the U shape by being bent at a predetermined position between the first end and the second end. As shown in FIG. 5, there is thus provided the connection structure between the tab 410 of the electrode assembly 400 and the positive electrode current collector 140 via the positive electrode lead plate 145 having the cross section in the U shape.

The upper spacer 600 is disposed between the end provided with the tab 410 of the electrode assembly 400 and the lid plate 110. More specifically, the upper spacer 500 partitions between the joint portion of the tab 410 to the positive electrode lead plate 146 and the power generating portion 430 of the electrode assembly 400. The tab 410 is inserted to the opening 520 provided at the upper spacer 500. As shown in FIG. 5, the buffer sheet 600 is interposed between the upper spacer 500 and the power generating portion 430 of the electrode assembly 400.

The structure around the positive electrode lead plate 145 shown in FIG. 5 is described above. The structure around the negative electrode lead plate 155 is similar to the structure around the positive electrode lead plate 145. Specifically, the tab 420 of the electrode assembly 400 and the negative electrode current collector 150 are electrically connected to each other via the negative electrode lead plate 155 having a cross section in a U shape (e.g., see FIG. 2). The upper spacer 500 partitions between the joint portion of the tab 420 to the negative electrode lead plate 155 and the power generating portion 430 of the electrode assembly 400. The tab 420 is inserted to the opening 520 provided at the upper spacer 500.

When the electrode assembly 400 is connected to the positive electrode current collector 140 and the negative electrode current collector 150 via the positive electrode lead plate 145 and the negative electrode lead plate 155 in this manner, the tabs 410 and 420 of the electrode assembly 400 can be made relatively shorter (in the winding axis direction (the Z axis direction)).

That is, the width (the length in the winding axis direction (the Z axis direction)) of the electrode plates for the positive electrode 460 and the negative electrode 460 necessary for production of the electrode assembly 400 can be made relatively shorter. This is advantageous in terms of efficiency in production of the electrode assembly 400, for example.

The upper spacer 500 is disposed on the upper end surface of the power generating portion 430 of the electrode assembly 400 with the buffer sheet 600 interposed therebetween. In this state, the upper spacer 500 is disposed on a soft end surface formed by aligned end edges of the separators 470a and 470b. The upper spacer 500 is thus difficult to be positionally determined dependently on the end surface.

In the energy storage device 10 according to the present embodiment, the locked portions 510 provided at the upper spacer 500 are locked to part of the lid plate structure 180 (the attachment portion 122 is shown in FIG. 5), so as to position the upper spacer 500. This locking structure will now be described with reference to FIGS. 6A and 6B.

Figure 6A:
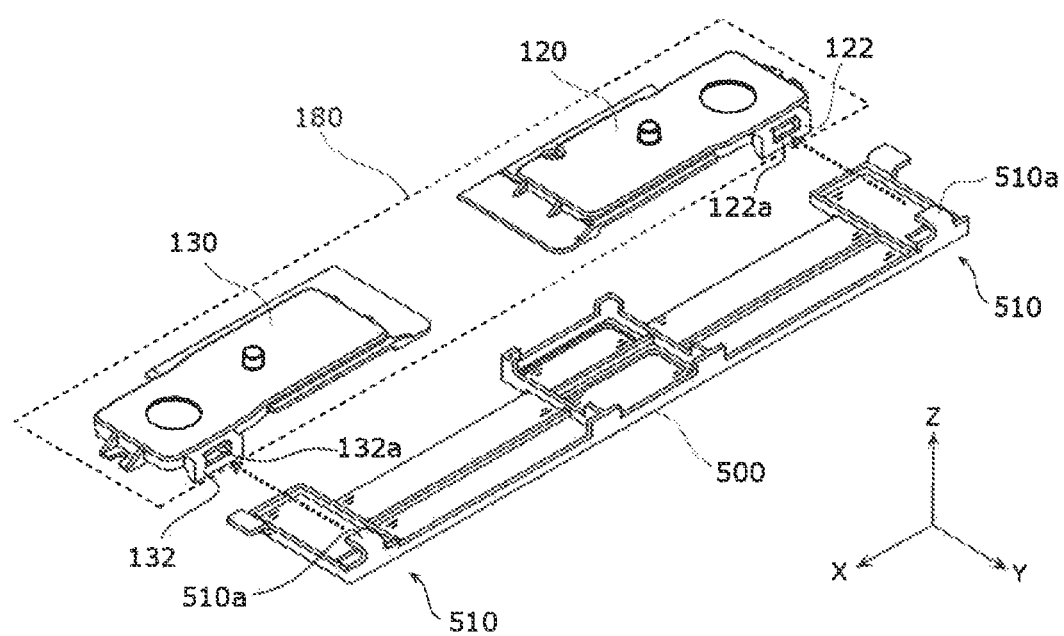
FIG. 6A: a first view of a locking structure of an upper spacer by the lid plate structure according to the embodiment.
Figure 6B:
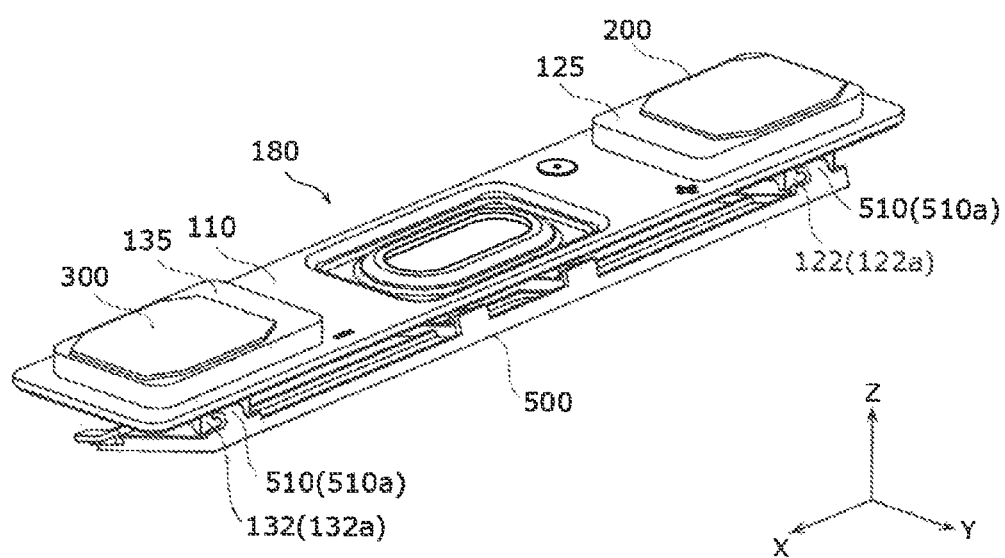
FIG. 6B a second view of the locking structure of the upper spacer by the lid plate structure according to the embodiment.

FIG. 6A is a first view of the locking structure of locking the upper spacer 500 by the lid plate structure 180 according to the embodiment, and FIG. 6B is a second view of the locking structure. FIG. 6A shows, in the lid plate structure 180, only the lower insulating members 120 and 130 and does not show the remaining elements. This also applies to FIG. 7 to be referred to later.

As shown in FIGS. 6A and 6B, the upper spacer 500 has the locked portions 510 each of which is locked to part of the lid plate structure 180 (the attachment portion 122 or 132 in the present embodiment). The upper spacer 500 is thus positionally determined and kept in the energy storage device 10. Specifically, the upper spacer 500 can be accurately located at a proper position, and is kept in this state.

Particularly when the electrode assembly 400 is provided with the projecting separator; the upper spacer 500 is disposed on the end surface of the soft separator and is thus difficult to be positioned. However, the present embodiment facilitates positioning the upper spacer 500 even in such a case.

When a plurality of energy storage devices 10 is produced, positional variation of the upper spacers 500 in the energy storage devices 10 is inhibited and the upper spacer 500 in each of the energy storage devices 10 is kept at a position determined during production.

The upper spacer 500 is positionally regulated with no provision of any dedicated component for such positional regulation. The energy storage device 10 can thus be produced efficiently, for example.

Furthermore, the power generating portion 430 of the electrode assembly 400 and the lid plate 110 can be made close to each other with the upper spacer 500 interposed therebetween, for example, so as to increase occupancy of the electrode assembly 400 in the volume of the case 100.

More specifically, the electrode assembly 400 according to the present embodiment is formed by winding the positive electrode 450 and the negative electrode 460, and the upper spacer 500 is disposed at the end provided with the tabs 410 and 420 of the electrode assembly 400, that is, in the winding axis direction of the electrode assembly 400.

In other words, the electrode assembly 400 of the winding type is accommodated in the case 100 in a posture provided with the upper spacer 500 and the lid plate structure 180 in the winding axis direction of the electrode assembly 400, and the upper spacer 500 is disposed in the state of being locked to the lid plate structure 180. The upper spacer 500 can thus be disposed independently from the soft end surface formed by the end edges of the separators 470a and 470b in the sheet shapes wound along with the positive electrode 450 and the negative electrode 460.

The upper spacer 500 and the buffer sheet 600 are disposed above the power generating portion 430 in the present embodiment. Even when there is any foreign matter such as a microscopic metal piece in the case 100, the upper spacer 500 or the buffer sheet 600 inhibits the foreign matter from entering the power generating portion 430 through a gap between the end edges of the separators 470a and 470b aligned in the layered direction.

The upper spacer 500 according to the present embodiment is provided, at the respective ends in the longitudinal direction (the X axis direction), with the locked portions 510, and the lid plate structure 180 has the attachment portions 122 and 132 at positions corresponding to the two locked portions 510. In other words, the energy storage device 10 is provided with two sets of the locked portions and the attachment portions so that the upper spacer 600 is supported with good balance in the longitudinal direction. The sets of the locked portions and the attachment portions can alternatively be one, three, or more. The energy storage device 10 has only to include at least one set of the locked portion and the attachment portion in accordance with the size, the shape, and the like of the upper spacer 500 or the lid plate structure 180.

The locked portions 610 according to the present embodiment each have a projection 610a projecting in a direction crossing the alignment direction of the electrode assembly 400 and the lid plate 110 (on the negative side in a Y axis direction in the present embodiment). The attachment portion 122 of the lid plate structure 180 further has an insertion port 122a allowing the projection 610a to be inserted thereto. The attachment portion 132 similarly has an insertion port 132a allowing the projection 510a to be inserted thereto.

That is, the locked portions 610 of the upper spacer 500 are each locked to the lid plate structure 180 in a state where the projection 510a is horizontally inserted to the insertion port 122a(132a). The upper spacer 500 is thus positionally regulated in the vertical direction in the case 100 without useless occupation of a space in the vertical direction (the Z axis direction) in the case 100, for example. This is advantageous in terms of increase in occupancy of the electrode assembly 400 in the volume of the case 100, in other words, increase in capacity of the energy storage device 10, for example.

In the present embodiment, the attachment portion 122 is provided at the lower insulating member 120 whereas the attachment portion 132 is provided at the lower insulating member 130. The lower insulating members 120 and 130 are produced by molding resin such as PC, and are thus easily shaped to have the attachment portions 122 and 132. In other words, the attachment portions 122 and 132 are regarded as having high flexibility in shape, position, or size.

The upper spacer 500 according to the present embodiment has the openings 520 allowing the tabs 410 and 420 to be inserted thereto, respectively. The upper spacer 500 can be formed to secure the spaces allowing the tabs 410 and 420 to be inserted thereto as well as cover the portion other than the tabs 410 and 420 in a top view. In other words, the upper spacer 500 can be formed to have a shape and a size appropriate for more reliable positional regulation of the electrode assembly 400, for example.

Figure 7:
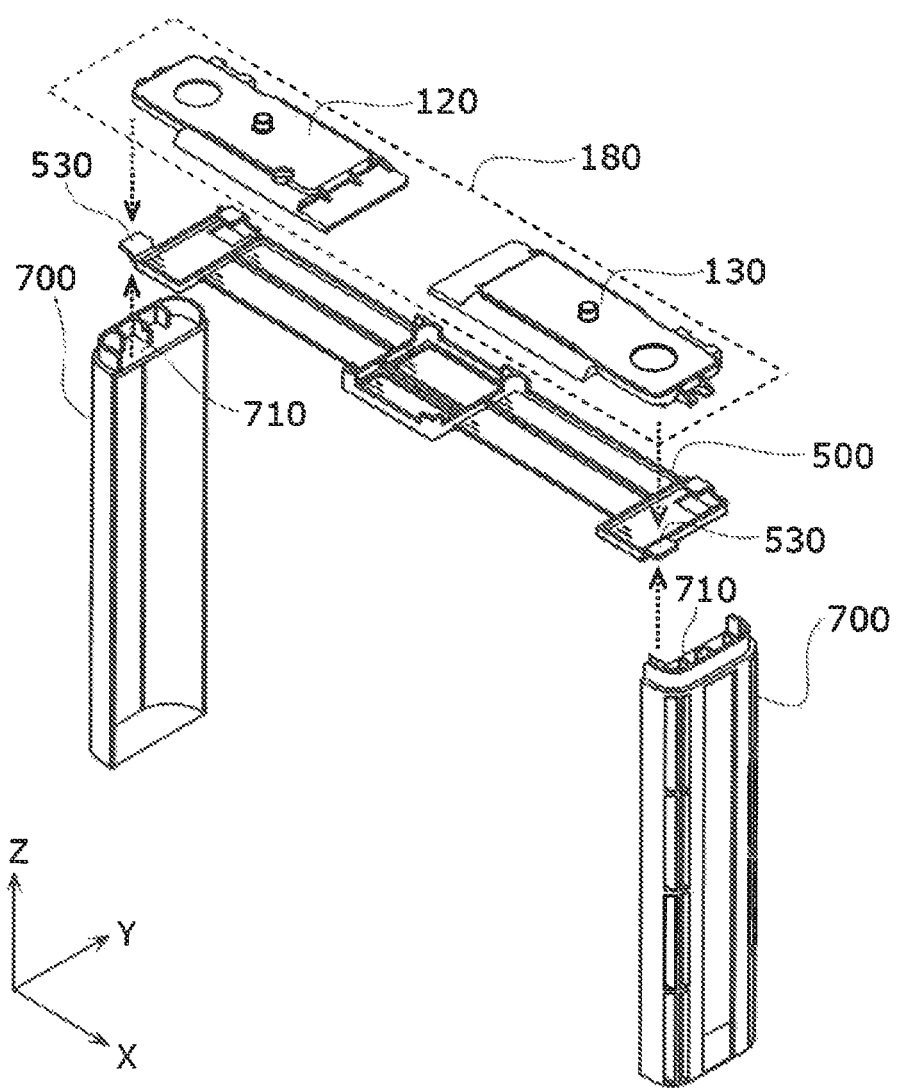
FIG. 7: a perspective view of a structural relation between side spacers and the upper spacer according to the embodiment.

The energy storage device 10 according to the present embodiment further causes the side spacers 700 to position (positionally regulate) the upper spacer 500. FIG. 7 is a perspective view of a structural relation between the side spacers 700 and the upper spacer 500 according to the embodiment.

As shown in FIG. 7 as well as FIG. 2 already referred to, the side spacer 700 is disposed between each of the side surfaces in the X axis direction of the electrode assembly 400 and the inner surface of the case 100 in the present embodiment. Each of the ends of the upper spacer 500 is interposed between corresponding one of the side spacers 700 and the lid plate structure 180.

The side spacers 700 are disposed on the sides of the electrode assembly 400 so as to positionally regulate the electrode assembly 400. Furthermore, each of the ends of the upper spacer 500 is interposed between corresponding one of the side spacers 700 and the lid plate structure 180. The upper spacer 500 is thus positionally regulated more reliably.

Specifically, the upper spacer 500 is provided, at each of the ends in the longitudinal direction, with a contact portion 530 that has a lower surface in contact with a support portion 710 provided at the upper end of corresponding one of the side spacers 700. The contact portions 530 have upper surfaces pressed from above by the lid plate structure 180.

More specifically, the contact portion 530 on the negative side in the X axis direction in FIG. 7 is interposed between the support portion 710 of the side spacer 700 disposed on the same side and the lower insulating member 120. Furthermore, the contact portion 530 on the positive side in the X axis direction in FIG. 7 is interposed between the support portion 710 of the side spacer 700 disposed on the same side and the lower insulating member 130.

In this manner, the energy storage device 10 according to the present embodiment has the structure in which the lid plate structure 180 locks the upper spacer 500 as well as the structure in which each of the ends of the upper spacer 500 is interposed between corresponding one of the side spacers 700 and the lid plate structure 180. The energy storage device 10 thus configured facilitates attachment of the upper spacer 500 during production of the energy storage device 10, and achieves positional stability of the upper spacer 500 when the energy storage device 10 is in use.

Specifically, the upper spacer 500 is attached to the lid plate structure 180 after the step of connecting the electrode assembly 400 and the lid plate structure 180 (joining the tab 410 of the electrode assembly 400 and the positive electrode lead plate 145, joining the positive electrode lead plate 145 and the positive electrode current collector 140, and the like), for example. Such attachment is achieved by locking the two locked portions 510 of the upper spacer 500 to the attachment portions 122 and 132 provided at the lid plate structure 180 (see FIGS. 6A and 6B). The upper spacer 500 can thus be easily attached to the lid plate structure 180 and is positionally determined in the vertical direction.

Furthermore, the lid plate 110 and the main body 111 (see FIG. 2) are joined to each other by laser welding or the like in this state. In other words, the lid plate structure 180 is fixed to the main body 111. As a result, each of the ends of the upper spacer 500 comes into the state of being interposed between corresponding one of the side spacers 700 and the lid plate structure 180. The position of the upper spacer 500 is thus substantially fixed in the case 100.

As described above, in the energy storage device 10 according to the present embodiment, the two locked portions 510 of the upper spacer 500 are locked to the attachment portions 122 and 132 of the lid plate structure 180 to provisionally fix the upper spacer 500 during production of the energy storage device 10. Furthermore, each of the contact portions 530 at the ends of the upper spacer 500 is interposed between corresponding one of the side spacers 700 and the lid plate structure 180. The upper spacer 500 is thus fixed permanently. In other words, the energy storage device 10 according to the present embodiment facilitates attachment of the upper spacer 500 at a proper position as well as inhibits subsequent displacement of the upper spacer 500.

OTHER EMBODIMENTS

Described above is the energy storage device according to the embodiment of the present invention. However, the present invention is not limited to the above embodiment. Unless departing from the purpose of the present invention, any mode obtained by applying various modifications devised by those skilled in the art to the above embodiment as well as any mode obtained by combining the plurality of constituent elements described above are included in the scope of the present invention.

For example, the number of the electrode bodies 400 included in the energy storage device 10 is not limited to one but can be two or more. Provision of such a plurality of electrode bodies 400 in the energy storage device 10 reduces vacant corner spaces in the case 100 in comparison to the case where the case 100 of the same cubic content (volume) accommodates a single electrode assembly 400. Accordingly, the electrode bodies 400 can occupy more in the volume of the case 100, to achieve increase in capacity of the energy storage device 10.

The electrode assembly 400 included in the energy storage device 10 is not required to be of the winding type. The energy storage device 10 can include an electrode assembly of the layered type including layered tabular plates, for example. The energy storage device 10 can be alternatively provided with an electrode assembly that includes long belt plates bent to be projected and recessed repetitively into a bellows shape.

The positional relation between the tab 410 for the positive electrode and the tab 420 for the negative electrode is not particularly limited in the electrode assembly 400. In the electrode assembly 400 of the winding type, the tab 410 and the tab 420 can be disposed opposite to each other in the winding axis direction. When the energy storage device 10 includes the electrode assembly of the layered type, the tab for the positive electrode and the tab for the negative electrode can project in different directions with respect to the layered direction.

In other words, in a structure in which the upper spacer 600 is disposed between the lid plate 110 and the end provided with at least one of the tab for the positive electrode and the tab for the negative electrode of the electrode assembly included in the energy storage device 10, the locked portions 510 of the upper spacer 500 are locked to part of the lid plate structure 180. The upper spacer 500 can thus be positioned independently from the end surface of the electrode assembly, for example.

Alternatively, the locked portion 510 of the upper spacer 500 can have an insertion port whereas the attachment portion 122 or 132 of the lid plate structure 180 can have a projection to be inserted to the insertion port. When one of part of the lid plate structure 180 and the locked portion 510 has a projection projecting in a direction crossing the alignment direction of the electrode assembly 400 and the lid plate 110, the other one of part of the lid plate structure 180 and the locked portion 610 has only to have an insertion port allowing the projection to be inserted thereto.

The projection 510a inserted to the insertion port 122a projects toward the negative side in the Y axis direction in the present embodiment. However, the projection is not limited thereto in terms of its projecting direction. Specifically, the projection provided at one of part of the lid plate structure 180 and the locked portion of the upper spacer 500 can be locked to the insertion port to positionally regulate the upper spacer 600 at least in the Z axis direction if the projection has a portion projecting in a direction crossing the alignment direction (the Z axis direction) of the electrode assembly 400 and the lid plate 110.

The portions locking the locked portions 510 of the upper spacer 500 (the attachment portions 122 and 132 in the above embodiment) at part of the lid plate structure 180 can be alternatively provided at positions other than the lower insulating members 120 and 130. For example, the locked portion 510 of the upper spacer 500 can be locked to the positive electrode current collector 140 or the negative electrode current collector 150.

The upper spacer 500 does not need to have the openings 520 recognized clearly, such as cut-away sections or through holes. In other words, the upper spacer 600 has only to be formed to have a shape and a size allowing the tabs 410 and 420 of the electrode assembly 400 to vertically pass therethrough, and does not need to have sites typically recognized as "openings". For example, the tabs 410 and 420 extending from the electrode assembly 400 can be made to pass through gaps between the upper spacer 500 having the rectangular shape in a planar view and the case 100.

The electrode assembly 400 can be optionally provided with none of the tabs 410 and 420. Specifically, for example, the electrode assembly 400 can be provided with an active material unapplied portion projecting in the winding axis direction, and the active material unapplied portion and the electrode terminal can be connected to each other by the current collector. The effects similar to those of the above embodiment can be exerted even in this case.

INDUSTRIAL APPLICABILITY

The present invention is applicable to an energy storage device, such as a lithium ion secondary battery.

The invention claimed is:
1. An energy device, comprising:
an electrode assembly including an electrode and a separator;
a case accommodating the electrode assembly;
a lid plate structure including a lid plate of the case, a current collector electrically connected to a tab provided at the electrode assembly, and an insulating member disposed between the lid plate and the current collector such that the current collector, the insulating member, and the lid plate are sequentially stacked in a stacking direction of the energy storage device; and
a first spacer disposed between an end provided with the tab of the electrode assembly and the lid plate and including a locked portion locked to a part of the lid plate structure,
wherein an end portion of the separator protrudes from the electrode toward the first spacer,
wherein one of the part of the lid plate structure or the locked portion includes a projection projecting in a direction crossing the stacking direction, and
wherein another one of the art of the lid plate structure or the locked portion includes an insertion port allowing the projection to be inserted thereto.

2. The energy device according to claim 1, wherein the part of the lid plate structure is provided at the insulating member.
3. The energy storage device according to claim 1, wherein the first spacer includes an opening allowing the tab to be inserted thereto.
4. The energy storage device according to claim 1, further comprising:
a second spacer disposed between a side surface of the electrode assembly, in a direction crossing an alignment direction of the electrode assembly and the lid plate, and an inner surface of the case,
wherein the first spacer includes an end interposed between the second spacer and the lid plate structure.
5. The energy storage device according to claim 1, wherein the electrode assembly is formed by winding electrodes including the electrode, and
wherein the first spacer is disposed in a winding axis direction of the electrode assembly at an end provided with the tab.
6. The energy storage device according to claim 5, wherein the electrode assembly is provided with the separator projecting in the winding axis direction.
7. The energy storage device according to claim 1, wherein the electrode assembly further includes another electrode, the separator being disposed between the electrode and said another electrode.
8. The energy storage device according to claim 7, wherein the end portion of the separator extends in a space provided above upper surfaces of the electrode and said another electrode to connect to the first spacer.
9. The energy storage device according to claim 1, further comprising a buffer sheet interposed between the first spacer and the electrode assembly, the end portion of the separator connecting to the buffer sheet.
10. The energy storage device according to claim 9, wherein the end portion of the separator extends in a space provided between the buffer sheet and upper surface of the electrode.
11. The energy storage device according to claim 1, wherein said one of the part of the lid plate structure or the locked portion includes the projection projecting in a direction substantially parallel to the lid plate.
12. The energy storage device according to claim 11, wherein said another one of the part of the lid plate structure or the locked portion includes the insertion port configured for insertion of the projection thereto.
13. The energy storage device according to claim 1, wherein the locked portion is locked to a part of the insulating member disposed between the lid plate and the current collector.
14. An energy storage device, comprising:
an electrode assembly including an electrode and a separator;
a case accommodating the electrode assembly;
a lid plate structure including a lid plate of the case, a current collector electrically connected to the electrode assembly, and an insulating member disposed between the lid plate and the current collector such that the current collector the insulating member, and the lid plate are sequentially stacked in a stacking direction of the energy storage device; and
a spacer disposed between the electrode assembly and the lid plate and including a locked portion locked to a part of the lid plate structure,
wherein an end portion of the separator protrudes from the electrode toward the spacer, wherein one of the part of the lid plate structure or the locked portion includes a projection projecting in a direction crossing the stacking direction, and wherein another one of the part of the lid plate structure or the locked portion includes an insertion port allowing the projection to be inserted thereto.

15. The energy storage device according to claim 14, wherein said one of the part of the lid plate structure or the locked portion includes the projection projecting in a direction substantially parallel to the lid plate.

16. The energy storage device according to claim 15, wherein said another one of the part of the lid plate structure or the locked portion includes the insertion port configured for insertion of the projection thereto.

17. The energy storage device according to claim 14, wherein the locked portion is locked to a part of the insulating member disposed between the lid plate and the current collector.

18. An energy storage device, comprising:
an electrode assembly;
a case accommodating the electrode assembly;
a lid plate structure including a lid plate of the case, a current collector electrically connected to a tab provided at the electrode assembly, and an insulating member disposed between the lid plate and the current collector; and
a spacer disposed between an end provided with the tab of the electrode assembly and the lid plate and including a locked portion locked to a part of the lid plate structure, wherein one of the part of the lid plate structure or the locked portion includes a projection projecting in a direction substantially parallel to the lid plate, and wherein another one of the part of the lid plate structure or the locked portion includes an insertion port allowing the projection to be inserted thereto.

19. The energy storage device according to claim 18, wherein the electrode assembly includes an electrode and a separator, wherein an end portion of the separator protrudes from the electrode toward the spacer.

* * * * *